April 24, 1962 M. C. P. HEWITT ETAL 3,031,138

ELECTRICAL ACCUMULATORS FOR USE WITH RECORD CONTROLLED STATISTICAL MACHINES

Filed June 3, 1957

Inventors

MAURICE C. P. HEWITT & DONALD P. LAMBERT,

By Pirie & Stribley

1

3,031,138

ELECTRICAL ACCUMULATORS FOR USE WITH RECORD CONTROLLED STATISTICAL MACHINES

Maurice Charles Paton Hewitt, Wallington, and Donald Paul Lambert, Addiscombe, England, assignors, by mesne assignments, to International Computers and Tabulators Limited, London, England, a British company Filed June 3, 1957, Ser. No. 663,026
Claims priority, application Great Britain July 31, 1956
4 Claims. (Cl. 235—133)

This invention relates to electrical accumulators for use with statistical machines controlled by records such as perforated record cards, or perforated tape, or by cards, tape or other data-bearing media on which data is recorded by marks, for example marks having magnetic properties or light absorbing properties, and from which data is sensed for transmission to the accumulator.

It has been proposed in an electric accumulator to effect carries and carries-on-carries by a carry pulse which is transmitted in series through the counter units of the accumulator from a counter unit of lower denomination, but with an arrangement of this kind the carry pulse tends to become attenuated to an extent such that when the accumulator comprises ten or more denominations the pulse cannot be relied on to effect carries to the counter units of higher denomination.

It is an object of the present invention to provide an improved carry system wherein all carries are effected by a carry pulse applied simultaneously to each counter unit and in which carries to the counter units of higher denomination are not effected by a carry pulse which has been transmitted in series through the counter units of the accumulator from the units of lower denomination.

According to the invention there is provided an electrical accumulator comprising for each of a plurality of denominational orders an input line connected to a counter unit to permit digit-representing pulses to be entered in parallel to the counter units, a carry memory switch and a timing switch for each counter unit arranged in series, said timing switches being cyclically and simultaneously operable during a carry period succeeding an adding period to connect the counter units to a carry pulse line, a carry-conditioning device for each counter unit except that of lowest denomination, said device for any one counter unit being connected to and rendered active by a carry switch operable by the counter unit of next lower denominational order and connected to a carry memory switch for said one counter unit to control operation thereof, said carry switches being connected one to each counter unit to be operated thereby when the counter unit passes from the standing-on-maximum condition to the zero condition thereof, and for each said device a pre-carry switch connected therewith to be rendered active simultaneously during a carry-on-carry period succeeding an adding period and preceding a carry period, each said pre-carry switch being connected in series with a carry-on-carry switch connected with the counter unit of next lower denomination thereby when the counter unit is in the standing-on-maximum condition thereof to connect the carry-conditioning device in parallel with the device of next lower denomination so that when during an adding period a carry-conditioning device is rendered active and the carry-on-carry switch appropriate to the device of next higher denominational order is rendered active the carry memory switch of said next higher order is conditioned to permit a carry to the counter unit associated therewith during the next succeeding carry period.

In order that the invention may be clearly understood, one embodiment thereof will now be described, by way of example, with reference to the accompanying drawings, in which:

2

Figure 1:
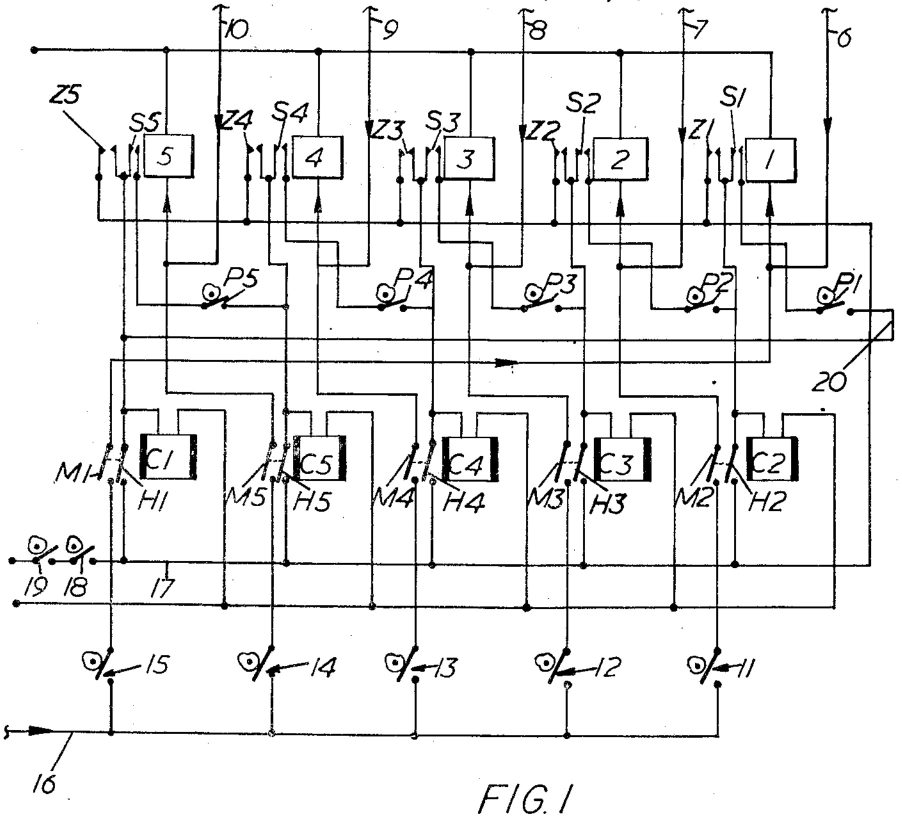
FIGURE 1 illustrates an electrical accumulator according to the invention.

Referring to FIGURE 1 of the drawings, five cyclically operable denominational counter units 1 to 5 are connected to form an electrical accumulator. The counter unit 1 is of lowest denomination and the counter unit 5 of highest denomination. Input lines 6 to 10 are respectively connected to the counter units 1 to 5 to transmit discrete digit-representing pulses to be entered into the accumulator in parallel. The counter units be of any suitable kind and may, for the purposes of the present description are considered to, be of the kind described in United States Patent No. 2,744,685, D. R. Lambert et al.

The counter units 1 to 5 are also arranged to receive carry pulses transmitted on a carry pulse line 16 from a source of carry pulses, not shown, by the conditioning of carry memory switches shown as pairs of relay contacts M1 to M5 appropriated one to each counter unit. The pairs of relay contacts M1 to M5 are normally open and are respectively adapted each to be conditioned by a carry-conditioning device appropriated thereto, and shown as the coils C1 to C5 of carry-conditioning electromagnetic relays. Each of the coils is rendered active by a carry switch (41, 42, 43, FIG. 1, United States Patent No. 2,744,685) for the counter unit of next lower denominational order, that is, coils C1 to C5 are respectively rendered active when carry switches Z1 to Z5 are closed, as described below, by counter units 1 to 5 passing from a maximum condition thereof to a zero condition thereof. The carry memory switch M1 is an end-around-carry memory switch for the counter unit 1 of lowest denomination and is operable by the coil C1 of an end-around-carry relay which is connected to an-end-around-carry switch Z5 of the counter unit of highest denomination to permit an end-around-carry to be effected, as is required, for example, in subtraction operations which are effected by complementary addition. A normally open carry timing switch is connected in series with each carry memory switch and is connected to the carry pulse line 16; that is, carry timing switches 11, 12, 13, 14 and 15 are respectively connected to carry memory switches M1, M2, M3, M4 and M5 and are open during adding and carry-on-carry periods so that if a closed carry memory switch is incorrectly energised by the counter unit to which it is connected, no potential will be transmitted through this carry memory switch on to the carry pulse line 16. The carry timing switches 11 to 15 are respectively operable by cams 11*a*, 12*a*, 13*a*, 14*a*, 15*a*, to be closed simultaneously preparatory to a carry pulse being transmitted from the carry pulse line 16 to the carry memory switches.

When a counter unit passes from a maximum condition thereof to a zero condition thereof on receipt of a digit pulse the appropriate one of carry switches Z1 to Z5, FIG. 1, in the counter unit is closed. Carry switches Z1 to Z4 and end-around-carry switch Z5 are respectively operable, when closed, to connect the coils C2 to C5 and C1 of the carry-conditioning relays to a current supply line 17. Line 17 is connected to a source of direct current, not shown, through a cyclically operable reset switch 18 and an isolating switch 19 which are closed during an adding operation, and which are respectively operable, when open, to reset the carry-conditioning relays at the end of an adding operation, and to isolate the relays when the accumulator is zeroised at the end of a sequence of adding operations thereof. The switches 18 and 19 are operable by cams 18*a* and 19*a* which rotate in timed relation with the cams 11*a* to 15*a*. A pair of contacts of each carry-conditioning relay forms a hold-on switch for the relay connected across each carry switch, that is hold-on switches H1, and H2 to H5 are respectively connected across carry switches Z5 to Z1 to Z4. The operation of the hold-on switches is as follows. Consider for example the operation of the counter unit 2. If during an adding period, being the time in which digit-representing pulses are added into the accumulator, the counter unit 2 passes from a maximum condition thereof to a zero condition thereof, the carry switch Z2 will close. The coil C3 will then be connected to the current supply line 17 and the carry-conditioning relay of which the coil C3 forms a part will operate to close hold-on contacts H3 and carry memory switch M3 which is connected to counter unit 3 thereby to condition the unit 3 to receive a carry during the next carry period. If the carry switch Z2 is then opened, by reason of a further digit representing pulse being received by the counter unit 2, the relay will remain energized by connection of the coil C3 to the line 17 through the hold-on switch H3, and will remain energised to maintain the carry memory switch M3 closed until the line 17 is disconnected from the current source by the opening of switch 18.

Each relay coil has appropriated thereto a carry-on-carry switch (39, 40, 43, FIG. 1, United States Patent No. 2,744,685) which is operable to connect the coil in parallel with the coil of next lower denomination and which is operable by the counter unit of next lower denomination. A pre-carry switch P1 to P5 is connected in series with the carry-on-carry switch appropriate thereto. A carry-on-carry switch is closed when a counter unit is in the standing-on-maximum condition thereof. That is, the carry-on-carry switches S1 to S5 operable by the counter units 1 to 5 are respectively connected in series with pre-carry switches P1 to P5, and the switches S1 to S5 and P1 to P5 are operable, when closed, to connect the coils C1 to C5 in parallel. The coil C1 is connected in parallel with the coil C5 through switches S5 and P5 to permit an end-around-carry-on-carry as is required in subtraction operations which are effected by complementary addition, and coil C1 is connected to switches P1 and S1 by a line 20. The pre-carry switches are normally open to prevent any possibility of a back carry from a counter unit to the counter unit of next lower denomination and are cyclically operable by cams 1*a*, 2*a*, 3*a*, 4*a* and 5*a* during a carry-on-carry period, as described below. The cams 1*a* to 5*a* rotate in timed relation with the cams 11*a* to 15*a*, 18*a* and 19*a*.

Although each of the switches shown in FIG. 1, has a finite contact resistance, the attenuating effect of these resistances will not be effective because as each relay operates its hold-on switch closes, and the coil of each relay is connected directly to line 17 through its hold-on switch and not through a number of contacts in series.

The circuit shown in FIG. 1 and described above is arranged to permit a carry from one denomination to the next higher denomination of an accumulator by the operation of carry switches Z1 to Z5 during an adding period and to permit the carry memory switches M1 to M5 to be conditioned, as appropriate, for carries-on-carries which are to be entered into the accumulator as the consequence of an adding operation. The time taken to enter a number into the accumulator is illustrated by the timing chart of FIGURE 2 and is divided into four periods, an adding period, a carry-on-carry period, a carry period, and a reset period. During the adding period digit pulses, a maximum of nine if counting in a decimal radix or eleven for a duodecimal radix, are entered into each denomination of the accumulator and during the carry-on-carry period carry memory switches are conditioned, as appropriate, so that at the end of the carry-on-carry period all carry memory switches for the counter units to which a carry digit is to be added are closed. A carry pulse on carry pulse line 16 is then applied, during a carry period following the carry-on-carry period, simultaneously to those counter units whose carry memory switches are closed. By this arrangement all carries are effected by a carry pulse applied simultaneously to all carry memory switches and the counter units of higher denomination do not, as heretofore, rely on a carry pulse which has been transmitted through the units of lower denomination with consequent attenuation.

Figure 2:
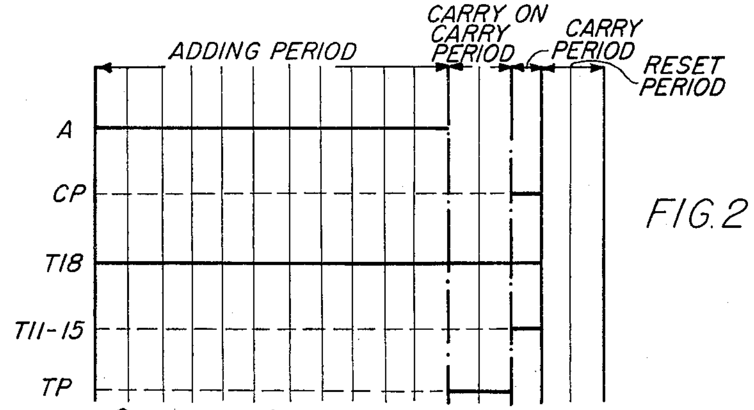
FIGURE 2 is a timing diagram.

In the timing diagram of FIGURE 2 the line A indicates the adding period during which discrete digit-representing pulses are entered in parallel into the counter units on lines 6 to 10, FIG. 1; the full line portion of line CP indicates the carry period during which the line 16 is energised by the application of a carry pulse thereto; the line T18 indicates that switch 18 is closed throughout the adding, carry-on-carry, and carry periods, the full line portion of line T11–15 indicates that switches 11 to 15 are closed during the carry period, and the full line portion of line TP indicates that switches P1 to P5 are closed during the carry-on-carry period.

The manner of operation of the accumulator will now be described with reference to two examples, the accumulator being considered as an accumulator for decimal numbers. First the addition 34624+15509=50133.

In this example the counter units 1 to 5 have the number 34624 stored therein, and the number 15509 is to be entered into the accumulator to give the sum 50133. Preparatory to the operation, switches 18 and 19 will be closed. During the adding period A, FIG. 2, discrete digit representing pulses will be entered into the counter units in parallel on lines 6 to 10; 9 pulses on line 6, no pulses on line 7, 5 pulses on each of lines 8 and 9, and 1 pulse on line 10, corresponding to the entry of the number 15509 to be added into the accumulator.

During the adding period A the counter units 1 and 3 will respectively pass the standing-on-maximum positions thereof to zero and then to the "3" and "1" registering positions thereof. Thus the carry switches Z1 and Z3 will close and energise the relay coils C2 and C4 so that hold-on switches H2 and H4 are closed and carry memory switches M2 and M4 are conditioned for carries to units 2 and 4 respectively. The carry switches Z1 and Z3 each open as the units 1 and 3 respectively move from the zero to the "1" positions thereof, but the hold-on switches H2 and H4 maintain coils C2 and C4 energised and carry memory switches M2 and M4 are conditioned. At the end of the adding period unit 4 is in the standing-on-maximum condition thereof so that the carry-on-carry switch S4 for unit 4 is closed. Accordingly during the carry-on-carry period TP on closing of the pre-carry switches P1 to P5 the coil C5 is connected in parallel with coil C4 and current from line 17 passes via closed hold-on switch H4, and switches P4, S4 to energise coil C5 so that hold-on switch H5 closes and carry memory switch M5 is conditioned to memorise the carry-on-carry from unit 4. During the carry period CP, on closing of switches 11 to 15 the carry pulse on line 16 will be simultaneously entered into units 2, 4 and 5 through the conditioned carry memory switches M2, M4, M5. The energised coils C2, C4 and C5 are de-energised during the re-set period by the opening of switch 18.

As a second example, let it be assumed that the subtraction operation 36454−36374=80 is to be performed.

This is performed by adding the 9's complement of 36374, namely 63625, to 36454 and adding the carry from the highest denomination as an end-around-carry into the lowest denomination of the accumulator.

At the beginning of the operation, the number 36454 is set up in the counter units 1 to 5 and during the adding period the number 63625 is entered in parallel into the counter units. This results in the number 99079 being stored in the counter units at the end of the adding period, and in the closing of the carry memory switch M4 during the adding period, since the counter unit 3 passes from the maximum condition to the zero condition thereof during the adding period. That is, at the end of the adding period A switches S1, H4, M4, S4 and S3 are closed. When during the carry-on-carry period TP, switches P1 to P5 close, coils C2, C4, C5 and C1 are energised and at the end of the carry-on-carry period hold-on switches H2, H4, H5 and H1 are closed and carry memory switches M1, M2, M4 and M5 are conditioned for carries. During the carry period CP when switches 11 to 15 close, a carry pulse is entered simultaneously into each of the counter units 1, 2, 4 and 5, and at the end of the carry period the result 80 is stored in the counter units. The energised coils C1, C2, C4 and C5 are then de-energised during the reset period by the opening of switch 18.

At the end of a sequence of adding or subtracting operations such as those described above, provision is made for resetting the counter units by means not shown. While resetting the counter units, it is necessary to avoid energisation of coils C1 to C5 and the switch 19 is opened to cut off the current supply thereto.

It will be apparent that the improved carry system described above may be employed when the counter units 1 to 5 are electronic counter units such as binary-coded flip-flop counter units. With an accumulator of this kind the carry-conditioning devices may be two state electronic storage devices such as flip-flop storage devices or cold cathode gaseous discharge tubes the inputs to which are connected in parallel through pre-carry and carry-on-carry switches, and the carry memory switches, pre-carry switches, carry-on-carry switches and carry timing switches may take the form of diode coincidence gating circuits.

Although in the foregoing examples the accumulator has been described as accommodating the decimal notation it will be understood that it may be designed to accommodate other forms of notation such, for example, as the Sterling notation.

We claim:

1. An electrical accumulator comprising a plurality of denominational counter units arranged to register digits entered in parallel into the respective units during an adding period, each said counter unit including a carry switch which is closed as a result of the unit passing from the standing-on-maximum condition thereof to the zero condition thereof and a carry-on-carry switch which is closed when the counter unit is in the standing-on-maximum condition thereof, a number of carry-memory switches appropriate one to each counter unit, a number of carry-conditioning devices each arranged to close one of the carry-memory switches and each carry-conditioning device except that for the carry-memory switch of lowest denomination being connected to the carry switch of the counter unit of next lower denomination to be rendered active during an adding period, a cyclically operable pre-carry switch for each denomination except the lowest connected in series with the carry-on-carry switch of the counter unit of that denomination to connect the carry-conditioning device of that denomination in parallel with the carry-conditioning device of next higher denomination, said pre-carry switches being arranged to be rendered active simultaneously during a carry-on-carry period succeeding an adding period and preceding a carry period, so that when during an adding period a carry-conditioning device is rendered active and the carry-on-carry switch of the counter of next higher denomination is rendered active the carry memory switch of next higher order is closed during the carry-on-carry period, so that a carry pulse applied to all the carry memory switches simultaneously in the carry period is transmitted through all closed carry-memory switches directly to the appropriate counter units.

2. An electrical accumulator according to claim 1, wherein the carry-conditioning device for the carry-memory switch of lowest denomination is connected to the carry switch of the counter unit of highest denomination, a cyclically-operable pre-carry switch is connected to the carry-on-carry switch of the counter unit of lowest denomination, and an end-around-carry line connects said carry-conditioning device of lowest denomination to said pre-carry switch.

3. An electrical accumulator comprising a plurality of denominational counter units, a plurality of input lines each connected to a counter unit to permit digit-representing pulses to be entered in parallel into the counter units during an adding period, each said counter unit including a carry switch which is closed as a result of the unit passing from the stand-on-maximum condition thereof to the zero condition thereof and a carry-on-carry switch which is closed when the counter unit is in the standing-on-maximum condition thereof, a carry-conditioning electromagnetic relay for each counter unit except that of lowest denomination, each said relay including normally open carry-memory contacts connected to the counter unit appropriate to that relay, hold-on contacts, and a coil which is connected to the carry switch of the counter unit of next lower denomination, a plurality of timing switches each arranged in series with the carry-memory contacts of one said relay, a carry pulse line connected to said timing switches which are cyclically and simultaneously operable during a carry period succeeding an adding period to connect said carry-memory contacts to the carry pulse line, the hold-on contacts on each said relay being connected across the carry switch connected to the coil of that relay and operable to maintain the relay energised to close the carry-memory contacts thereof at least until the end of a carry period succeeding the adding period in which the carry-memory contacts were closed, and for each denomination a cyclically operable pre-carry switch connected to the coil of the relay of that denomination, said pre-carry switches being rendered active simultaneously during a carry-on-carry period succeeding an adding period and preceding a carry period and each said pre-carry switch being connected in series with the carry-on-carry switch of the counter unit of that denomination whereby when said counter unit is in the standing-on-maximum condition thereof said relay is connected in parallel with the relay of next higher denomination so that when during an adding period a relay is energised and the carry-on-carry switch of the counter of the same denomination as the relay is rendered active the carry memory contacts of the relay of said next higher denomination are closed to permit a carry to the counter unit associated therewith during the next succeeding carry period.

4. An electrical accumulator according to claim 3, wherein the coil of the carry-conditioning relay including the carry memory contacts of lowest denomination is connected to the carry switch of the counter unit of highest denomination, a cyclically operable pre-carry switch is connected to the carry-on-carry switch of the counter unit of lowest denomination, and an end-around-carry line connects the coil of said carry-conditioning relay to said pre-carry switch.

References Cited in the file of this patent

UNITED STATES PATENTS

| | | |
|---|---|---|
| 1,862,004 | Carrol | June 7, 1932 |
| 1,882,764 | Bryce | Oct. 18, 1932 |
| 2,484,115 | Palmer et al. | Oct. 11, 1949 |
| 2,785,859 | Steinberg | Mar. 19, 1957 |
| 2,786,631 | Hewitt et al. | Mar. 26, 1957 |